(12) United States Patent
Vance et al.

(10) Patent No.: US 7,089,109 B2
(45) Date of Patent: Aug. 8, 2006

(54) COMPREHENSIVE MAPPING DATA STRUCTURES AND METHODS FOR USING THE SAME

(75) Inventors: Amos Dylan Vance, Seattle, WA (US); Timothy S. McGrath, Redmond, WA (US); Julia M. Crawford, Seattle, WA (US); Aiden Byrne, Redmond, WA (US); Norm Bryar, Sammamish, WA (US); Christopher Jon Lang, Seattle, WA (US); Michael J. Antonio, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 321 days.

(21) Appl. No.: 10/662,907

(22) Filed: Sep. 15, 2003

(65) Prior Publication Data

US 2004/0204835 A1    Oct. 14, 2004

Related U.S. Application Data

(60) Provisional application No. 60/462,058, filed on Apr. 10, 2003.

(51) Int. Cl.
*G01C 21/30* (2006.01)
(52) U.S. Cl. ...................... 701/208; 701/209
(58) Field of Classification Search ............... 701/202, 701/206, 207, 209, 210, 211, 213; 455/457, 455/456.1, 456.6; 340/988, 993, 995, 995.1–995.27
See application file for complete search history.

(56) References Cited

U.S. PATENT DOCUMENTS

| 5,353,023 | A  | * | 10/1994 | Mitsugi ..................... 340/989 |
| 6,415,227 | B1 | * | 7/2002  | Lin .......................... 701/213 |
| 6,633,763 | B1 | * | 10/2003 | Yoshioka ................... 455/457 |
| 6,925,381 | B1 | * | 8/2005  | Adamczyk ................. 701/210 |
| 6,937,869 | B1 | * | 8/2005  | Rayburn .................... 455/457 |

OTHER PUBLICATIONS

Annual Conference Series 2001, Rendering Effective Route Maps: Improving usability through generalization, Aug. 2001, pp. 241-250.

* cited by examiner

*Primary Examiner*—Richard M. Camby
(74) *Attorney, Agent, or Firm*—Workman Nydegger (57) ABSTRACT

A location data structure represents a location in a number of different ways, and may include a map view scale appropriate for rending the map. A map view data structure contains sufficient information to derive a number of independent descriptions of a map view. A route data structure may be used at any point in the route calculation and rendering process, and includes a locations field that includes the two-end points of the route, a calculated route data field representing a calculated route between the two end-points, an options field that specifies the options used or to be used to calculate the route, a driving directions field that represents driving directions for the route, and an identity data field that specifies whether the route data structure is a request to calculate a route, a response to a route calculation request, or a rendering request.

7 Claims, 5 Drawing Sheets

COMPREHENSIVE MAPPING DATA STRUCTURES AND METHODS FOR USING THE SAME

CROSS-REFERENCE TO RELATED APPLICATIONS

The application claims priority to co-pending U.S. provisional patent application Ser. No. 60/462,058 filed Apr. 10, 2003, which application is incorporated herein by reference in its entirety.

BACKGROUND OF THE INVENTION

1. The Field of the Invention

The present invention relates to electronic networked mapping services; and more specifically, to comprehensive mapping data structures and methods for using the same.

2. Background and Related Art

Computing technology has transformed the way we work and play. Computing systems may now perform a variety of functions including the accessing of services provided over a network or the Internet. One important class of services offered over a network relate to mapping services. For instance, a user may specify a location, and obtain a map centered at that location. The user may navigate to the left, right, up or down to change the center point of the map, and may zoom in or out on the map to thereby change the level of map detail. A user may also specify two locations, and have the mapping service estimate the fastest or shortest route between those two locations. The route may be conveniently highlighted on the rendered map. Accordingly, mapping services provide a useful resource that allows individuals to view maps and navigate from one location to another.

The mapping service typically provides a user interface that is relatively straightforward and user-friendly. However, hidden from the user are the many detailed and complicated functions that support such a user-friendly environment. In fact, those designing and drafting code for such mapping applications are faced with many challenges.

For instance, there are many ways that a user may wish to describe a location. For example, a user may specify an exact position by longitude, latitude and potentially also altitude. A user may also specify a location by its postal address or by its name. For example, a user may specify a location as 34 West Eighth Street, FictionTown, FictionState, or may specify a location such as "FictionTown Court House". To allow for mapping using any of these ways of specifying a location would require significant coding efforts. Accordingly, to avoid such extensive coding efforts, many mapping services do not allow for the identification of the location using all of these various ways of specifying a location. Instead, the user is simply required to conform to a fewer number of specific ways of designating the location. Alternatively, different data structures are used to describe locations using different descriptive ways, thereby making it quite complex in terms of lines of code to interface with all of those different location data structures.

Another difficulty is associated with how a best view for the map is identified. When a location is rendered, the location is typically rendered in the appropriate center of the map. However, depending on the location, different map views having different zoom factors may be appropriate. For example, if the location is the "United States", the map view would be centered at around the center of the United States (e.g., possible somewhere in Kansas). However, the zoom factor would be relatively low thereby allowing all of the United States to be rendered in a single window. On the other hand, if the location were "Kansas", the center of the map would be somewhere in the appropriate middle of the map with the zoom factor being somewhat greater including all of Kansas, but not all of the United States.

The map view may be specified in a number of different ways. For example, the map view may be properly represented by the center point, the height, and the width of the map; by the center point and scale of the map; by the location of two opposite corners of the map; or the like. Mapping services typically define a map view using only one of these ways, or else use a different data structure for defining a map view in different ways. The programmer that programs an application that uses the mapping service chooses which map view representation is most appropriate for the application being programmed. For example, if the application is to determine whether a particular location is within a map view, the programmer may choose a map view that is expressed in terms of two opposite corner points since it is easiest to make that determination with a map view expressed in such a way. On the other hand, it would be much harder for the programmer to design code to make that determination if the map view is represented in terms of center point and scale.

However, in order to program to a specific map view representation, the programmer needs to understand the basic structure and interfaces associated with that map view representation. If the programmer were to interface with a different map view representation, the programmer may need to learn entirely different basic structures and interfaces associated with that different map view. This poses quite a burden on the programmer of mapping applications.

For example, if a map view is to be zoomed in on by a factor of two, then the map view is more easily changed using fewer processor cycles if the map view is represented using the center point and a scale, as compared to representing the map view using a location of two opposite corners. On the other hand, if the map view is simply to be shifted left, right, up or down, the processing may be less intensive if the map view is represented using the location of two opposite corners, as compared to representing the map view using a center point and scale.

Furthermore, a different route data structure is conventionally used to describe route information depending on the progress of route calculation. For instance, a route calculation request may include two end-points. The route calculation service may respond with a different data structure that includes that calculated route between the two end-points. A render request may be a different data structure altogether and may include the two-end points or perhaps the calculated route. To interact with each of these data structures, a programmer would need to understand these several data structures.

In addition, when calculating a route, it is not always clear to the client application that interfaces with the user whether or not the fastest route or shortest route was used to calculate the route, particularly if the client application did not itself specify which option is to be used when the client application initially requested the route calculation. There are cases in which it would be helpful for the client application to know how the route was calculated.

For example, the client application may display that the route was calculated using the fastest route. That may help the user realize how the route was calculated. Furthermore, sometimes when calculating a route, the two end-points may be "snapped" to a near location that may be used to more easily calculate a route. For example, "road snapping" replaces the designated end-points with the nearest road intersection. "City snapping" or "highway snapping" replaces the designated end-points with the nearest highway.

Such snapping may more closely conform with the intent of the user. For example, if the user specifies "Topeka, Kans." as one location, the location associated with Topeka, Kans. may actually be represented by a specific central location as identified by longitudinal and latitudinal coordinates. However, the user may not be interested in traveling to or from that specific central point, but perhaps only from the main highway leading through Topeka. However, the mapping service typically does not specify how the end-points were snapped. Accordingly, the client application may not take appropriate action in response to such knowledge.

Accordingly, what would be advantageous is a mapping service in which locations and map views may be represented in different ways without increasing the complexity associated programming using the locations and map views. What would further be advantageous is if route calculation could be performed using more standardized data structures to improve ease of programming. Furthermore, what would be advantageous is a mapping service in which the requesting application was properly notified of the options used to calculate the route.

BRIEF SUMMARY OF THE INVENTION

The foregoing problems with the prior state of the art are overcome by the principles of the present invention, which is directed towards data structures that comprehensively describe locations, map views, and routes at various points in the progress of route calculation and rendering, and to data structures in which the route and the options used to calculate the route are both represented.

In accordance with a first aspect of the present invention, a location data structure represents a location in a number of different ways. For instance, the location data structure may have a data field that represents at least two geolocation coordinates for the location, data field that represents a fixed entity (such as an address or other identifiable fixed entity) approximated by the geolocation coordinates. The location data structure may also have a data field that represents a map view scale appropriate for rendering a map that includes the location. The mapping service and the client application may then use this location data structure as both inputs and outputs, using and populating information related to the location as appropriate.

In accordance with a second aspect of the present invention, a map view data structure contains sufficient information to derive a number of independent descriptions of a map view. The mapping service or client application accesses the map view data structure, and identifies function that is to be performed on the map view represented by the map view data structure. The appropriate independent description is selected that is better suited for the function, and then the appropriate fields of the map view data structure is used to formulate the independent description. The selected description is then used to perform the function.

In accordance with a third aspect of the present invention, a route data structure represents the route at various points in the progress of route calculation and rendering. The route data structure includes a locations data field that when populated includes the two-end points of the route, a calculated route data field that when populated contains a calculated route between the two end-points, an options field that specifies the options used or to be used to calculate the route, a driving directions field that represents driving directions for the route, and an identity data field that specifies whether the route data structure is a request to calculate a route, a response to a route calculation request, or a rendering request. If the data structure is a route calculation request as specified by the identity field, then the data field that represents the two end-points (and potentially the options field) is populated. If the data structure is a response to a route calculation request, then the calculated route field is populated (along with potentially the locations, options, and driving directions fields). If the data structure is a request to render, then either or both of the locations and calculated route fields may be populated (along with potentially the options and driving directions fields). The rendering service then recalculates the route if appropriate, and then renders the route on a map.

In one embodiment, each of the comprehensive location, map view, and route data structures may be expressed as an eXtensible Markup Language (XML) document that is constrained by a specific XML schema. This would allow the data structures to be communicated using Simple Object Access Protocol (SOAP) envelopes.

In accordance with a fourth aspect of the present invention, a mapping service calculates the route between two locations in a manner that informs the requesting computing system of what options where used to calculate the route. The requesting client application may then act appropriately given the options used to calculate the route. In operation, the mapping service receives a request to calculate a route from a requesting computing system, the request including a routing data structure. The mapping service then determines what options are to be used to calculate the route. The options may include the snap type (e.g., road snap or highway snap) or the route type (e.g., fastest route or shortest route). The mapping service then calculates the route using the options, and then populates the routing data structure with the calculated route as well as the options used to calculate the route. The mapping service then returns the routing data structure to the requesting client application. Since a since routing data structure is used for both the request and the response, developers need only draft code that interfaces with that one routing data structure. Furthermore, the client application may be designed to act appropriately given how the route was calculated.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to data structures that comprehensively describe locations, map views, and routes, and to data structures that include the calculated route and the options used to calculate the route.

The location data structure represents a location in a number of different ways, and may include a map view scale appropriate for rending the map. The mapping service and the client application may then use this location data structure as both input and output, using and populating information related to the location as appropriate.

The map view data structure contains sufficient information to derive a number of independent descriptions of a map view. The mapping service or client application may then use the appropriate map view description to perform a function as is most appropriate for that function.

The route data structure represents the route at various points in the progress of route calculation and rendering. The route data structure includes a locations data field that when populated includes the two-end points of the route, a calculated route data field that when populated contains a calculated route between the two end-points, an options field that specifies the options used or to be used to calculate the route, a driving directions field that represents driving directions for the route, and an identity data field that specifies whether the route data structure is a request to calculate a route, a response to a route calculation request, or a rendering request. Which fields are populated depends on whether the data structure represents a request to calculate a route, a response to a route calculation request, or a request to render a route.

A mapping service calculating the route between two locations in a manner that informs the requesting computing system of what options where used to calculate the route. The requesting client application may then act appropriately given the options used to calculate the route. This may be accomplished using the route data structure.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code. Although not required, the invention will be described in the general context of computer-executable instructions, such as program modules, being executed by computers in network environments. Generally, program modules include routines, programs, data structures, components, data structures, etc. that perform particular tasks or implement particular abstract data types.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 1:
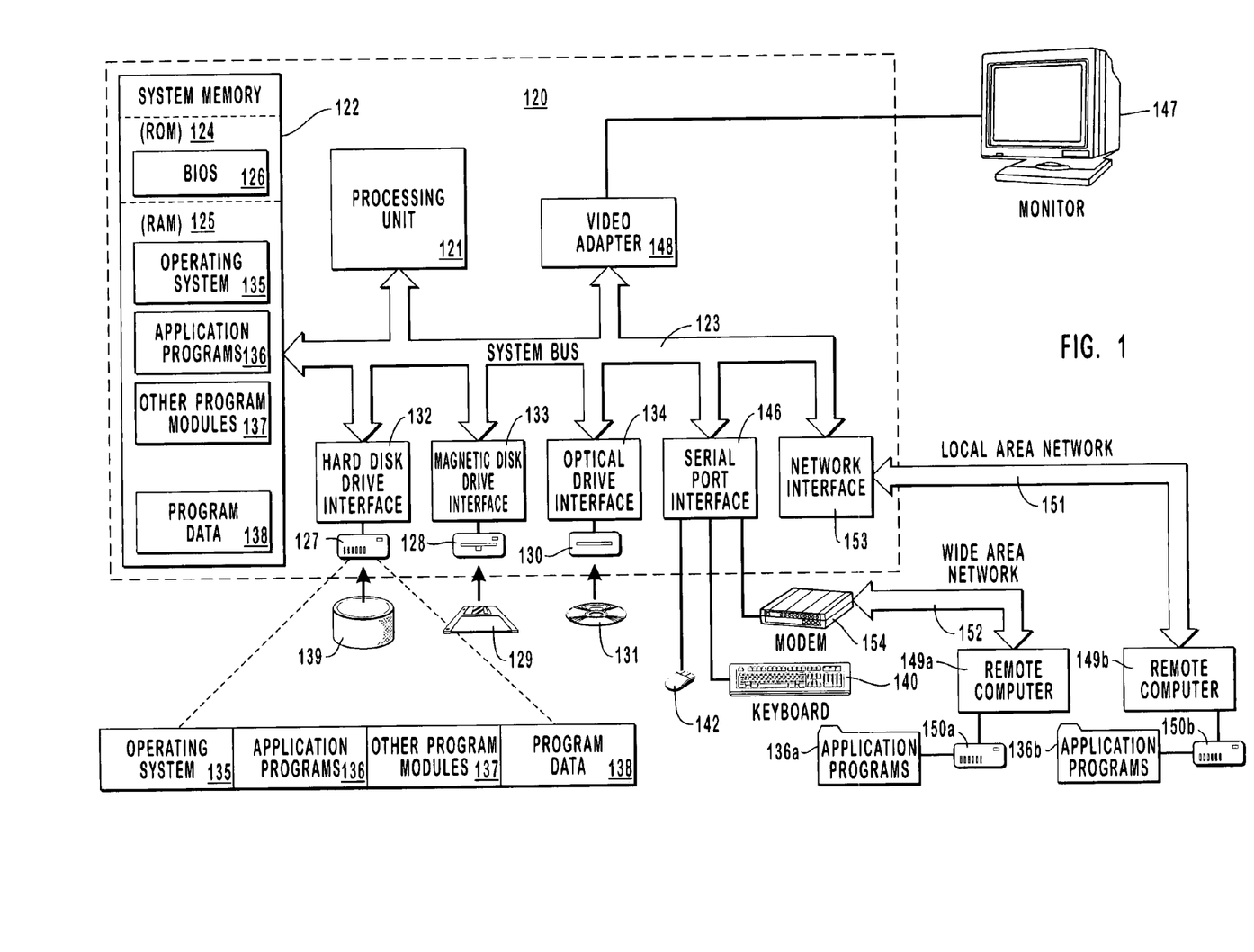
FIG. 1 illustrates a suitable computing system that may implement the features of the present invention.

FIG. 1 illustrates suitable computing environment in which the principles of the present invention may be employed in the form of a computer 120. The computer 120 includes a processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices, may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

While FIG. 1 represents a suitable operating environment for the present invention, the principles of the present invention may be employed in any computing system that is capable of browsing to network sites. The computing system illustrated in FIG. 1 is illustrative only, and by no means represents even a small portion of the wide variety of environments in which the principles of the present invention may be implemented. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

Figure 2:
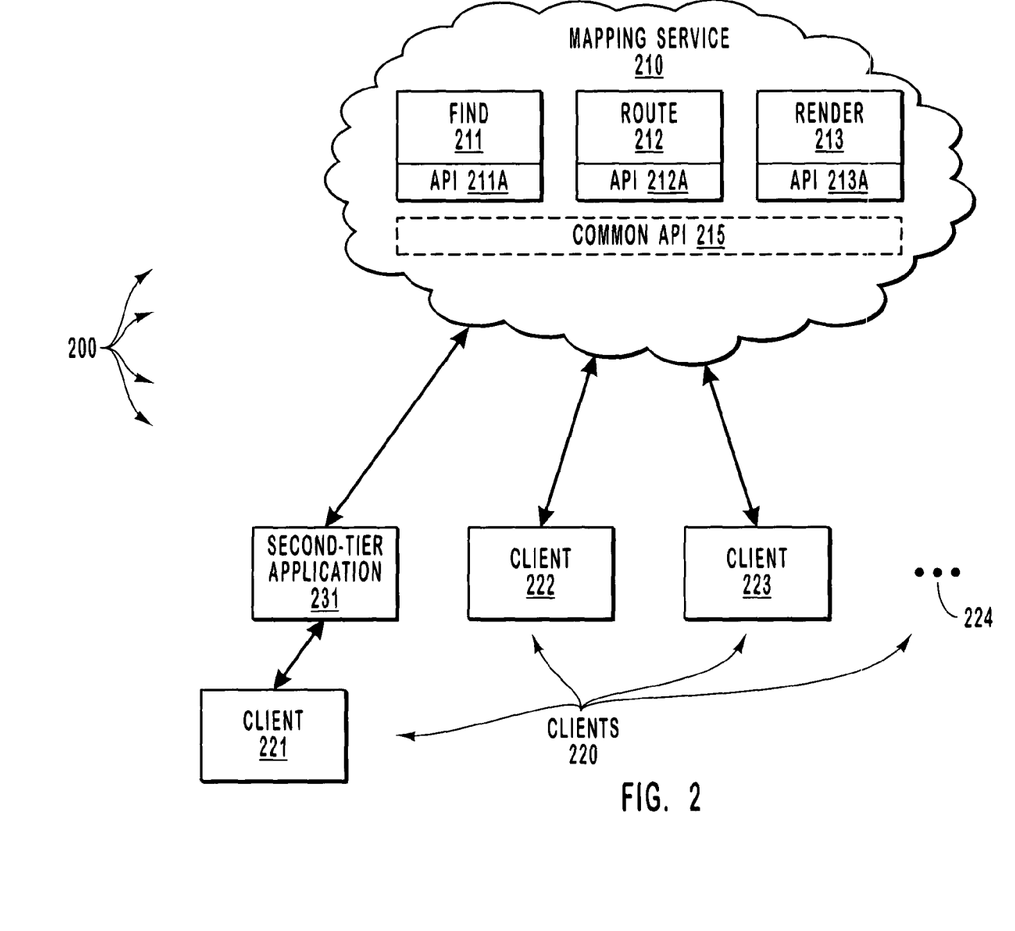
FIG. 2 illustrates a network environment that includes a mapping service and networked client application that use that mapping service by placing calls through one or more Application Program Interfaces (APIs)

FIG. 2 illustrates a network environment 200 in which the principles of the present invention may be employed. The network environment 200 includes a mapping service 210 that may be accessed by a number of client computing systems 220. In this description and in the claims, the term "client computing system" or "client" means any computing system that may consume services provided by the mapping service 210. This is not to say that client computing systems 220 may not act as servers in different contexts.

The mapping service 210 may comprise a single server computing system or multiple interconnected server computing systems. The mapping service 210 may communicate bi-directionally with the client computing systems 220 over network. There are three client computing systems 221 through 223 shown as being able to communicate with the mapping service 210. However, there may be more client computing systems capable of communicating with the mapping service as represented by the horizontal ellipses 224. If the mapping service 210 is a web site, numerous client computing systems may communicate with the mapping service 210 to obtain mapping services.

Note that the client computing systems 222 and 223 communicate directly with the mapping service 210, whereas the client computing system 221 communicates indirectly with the mapping service 210 via a second-tier application 231. For example, the second-tier application 231 may be a franchise web site that offers clients such as client computing system 221 access to information regarding maps relating to franchise locations. The second-tier application 231 may communicate with the mapping service 210 to obtain locations and maps that assist the second-tier application 231 in providing the franchise locations and maps to the client computing system 221. This further demonstrates how difficult it might be for the mapping service 210 to maintain state information for each user.

The services providing by the mapping service 210 may be broken down into three more specific services. For example, a find service 211 may find a location based on client input, a route service 212 may calculate a route between two locations, and a render service 213 may render a map into a form interpretable by the client. The services 211 through 213 may be provided by different server computing systems or may be provided by a single server computing system.

Client computing systems 220 may communicate with the mapping service 210 using a specific standard that is interpretable by both the client computing system and the mapping service. These communication standards are often known as Application Program Interfaces or "APIs" for short. For example, a client may communicate with the find service 211 using API 211A, with the route service 212 using API 212A, and with the render service 213 using the API 213A. Alternatively, clients may communicate with any of the services providing by the mapping service 210 through a single unified API 215.

In order to allow mapping application programmers to more conveniently interface with the mapping service 210, and in order to make a single unified API 215 for the mapping service 210 more feasible, a comprehensive location data structure may be passed back and forth between the client application of the client computing system and the mapping service. By passing around a single data structure that represents information of interest to a wide variety of applications, whether the information is provided as input or as output, the mapping application programmer need only draft code that generates or interprets that single location data structure, rather than drafting code that deals with multiple location data structures having different formats depending on the circumstances and application.

Figure 3:
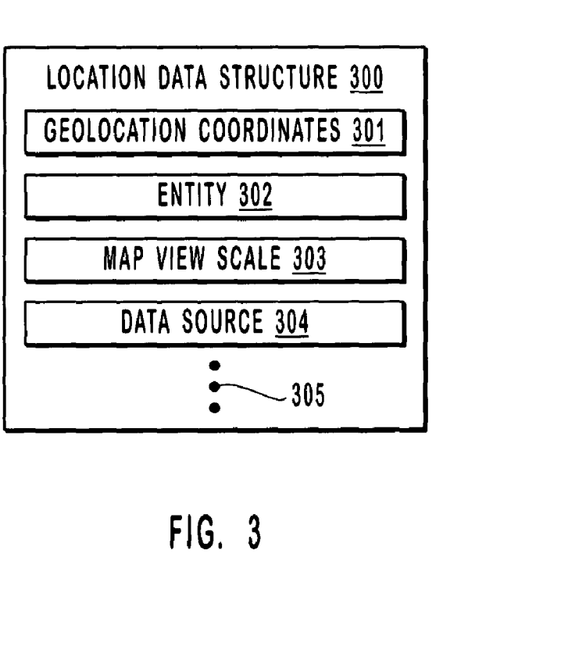
FIG. 3 illustrates a data structure of a comprehensive location data structure in accordance with the principles of the present invention.

In accordance with a first aspect of the present invention, FIG. 3 illustrates a schematic diagram of a location data structure 300 in accordance with one aspect of the present invention. The location data structure 300 contains information relevant to a location, such as, for example, geolocation coordinates 301 that at least approximate the location. For example, the geolocation coordinates may include longitudinal and latitudinal positions for the location, and perhaps may include altitude. The geolocation coordinates may also include any other coordinates that uniquely identify a location on, in, or over the Earth, or in the universe more generally. The geolocation coordinates field 301 may contain enough information that the position may be uniquely identified using a number of different geolocation coordinate systems.

The geolocation coordinates may be inputted by the client computing system. For example, the client computing system may be or have access to a Global Positioning System (GPS). The geolocation coordinates may also be inputted by the mapping service as when, for example, the client computing system requests coordinates corresponding to an address or other entity that corresponds to a position. The entity may be a fixed entity or political jurisdiction such as a town, state, country, landmark, park, airport, bridge, historical site, beach, hotel, business, or any other fixed entity. The entity may also be a mobile entity (e.g., a car or briefcase) in which case the geolocation coordinates represent the position of the mobile entity at a particular time.

The location data structure 300 also includes an entity field 302 that corresponds at least approximately to the location. As previously mentioned, the entity may be an address or other fixed or mobile entity. The entity field 302 may include an address field for the address as well as a descriptor field that describes the fixed or mobile entity. The entity field 302 may be inserted as input by the client computing system. For example, the client application may query for geolocation coordinates corresponding to a location since some route calculation algorithms are sometimes calculated using geolocation coordinates to describe the beginning and end points of the route. Furthermore, geolocation coordinates are more easily used in order to accurately render a map containing the location. The mapping service may also populate the entity field as when the client computing system is querying for a certain business establishment or other entity closest to a location represented by geolocation coordinates. In other words, the geolocation coordinates field 301 and entity field 302 may be populated by either the client computing system or the mapping service as is appropriate given the application and the service requested, and while allowing the mapping application developer to interface with a single location data structure.

The location data structure 300 also may contain a map view scale field 303 that contains scale information (zoom factors, scales, or the like) that instruct regarding an estimated optimal view when rendering the location. For example, when rendering Kansas on a map, it is often more appropriate to have a larger zoom factor than when rendering the United States on a map. The map view field 303 may be populated by either the client computing system or the mapping service, although the mapping service may often be in a better position to estimate an optimal map view scale.

The location data structure 300 also contains a data source 304 which may assist in uniquely identifying a fixed or mobile entity represented in the entity field 302. The location data structure 300 may also contain other information 305 relevant to that location, or that is helpful to the manipulation of the location data structure 300. Accordingly, a single comprehensive location data structure is described that allows for simplified software development of client applications that interface with the location data structure 300 in order to access the mapping services 210. In particular, a developer need only learn the structure of a single location data structure independent of how the developer wants to identify that location. The developer thus need only learn the data structure and interfacing techniques associated with a single location data structure.

In operation, the client computing system accesses an instance of the location data structure and populates data into at least one of its fields. The client computing system then passes the location data structure to the mapping service. The mapping service receives the location data structure, adds or changes data in the location data structure, and then passes the location data structure back to the client computing system. Which data fields are populated by the client mapping application or the mapping service may flexibly depend on the application running and service desired, giving the programmer greater flexibility without increasing complexity associated with programming code that accesses the location data structure.

Figure 4:
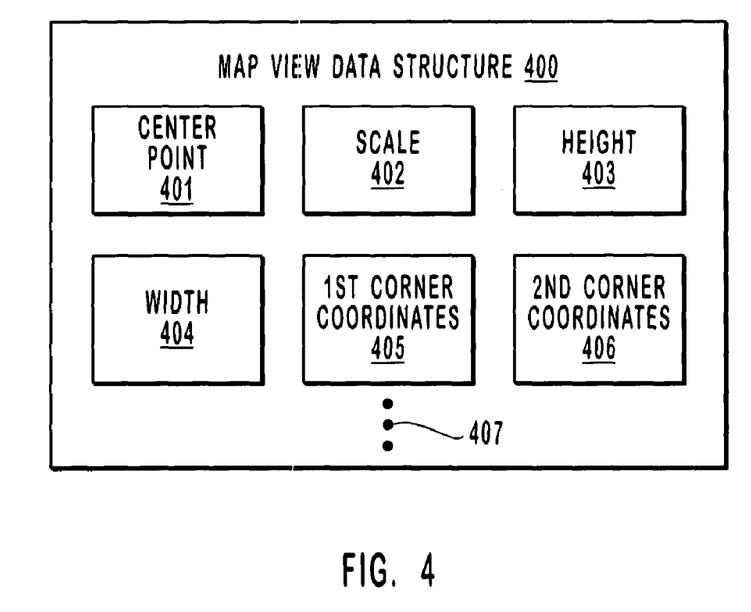
FIG. 4 illustrates a data structure of a comprehensive map view data structure in accordance with the principles of the present invention.

In accordance with a second aspect of the present invention, a comprehensive map view data structure may also be used when interfacing between the client computing system and the mapping service. FIG. 4 illustrates a schematic of a map view data structure 400. The map view data structure 400 contains sufficient information to derive a number of independent descriptions of a map view. For example, the map view data structure 400 contains a center point field 401 that indicates the center of a map, scale field 402 that indicates the map scale, height field 403 that represents the height of the map (e.g., in miles, kilometers, feet, meters, or the like), width field 404 that represents the width of the map, a first corner coordinate field 405 that represents the position of one corner (e.g., a southwest corner) of the map, a second corner coordinate field 406 that represents a position of an opposite corner (e.g., a northeast corner) of the map, among other information as represented by the vertical ellipses 407.

From this information may be derived a number of independent descriptions of a map view. For example, one independent description may be derived from the center point, height, and width of the map. A second independent description may be derived from the center point and scale. A third independent description may be derived from the first and second corner coordinates. Other independent descriptions are also possible from the data represented in the map view data structure 400 of FIG. 4.

The inclusion of sufficient map information to derive multiple independent descriptions of a map view is advantageous because it allows for a computing system performing a function on a map to select the independent description that is most suitable for that function. Furthermore, the use of a common map view data structure to represent multiple independent map view descriptions allows the mapping programmer to only deal with a single map view data structure while still enabling the application to use whatever independent map view description the programmer deems best given the circumstances. For example, if the application is to determine whether a particular location is within a map view, the programmer may choose a map view that is expressed in terms of two opposite corner points since it is easiest to make that determination with a map view expressed in such a way. On the other hand, it would be much harder for the programmer to design code to make that determination if the map view is represented in terms of center point and scale.

Figure 5:
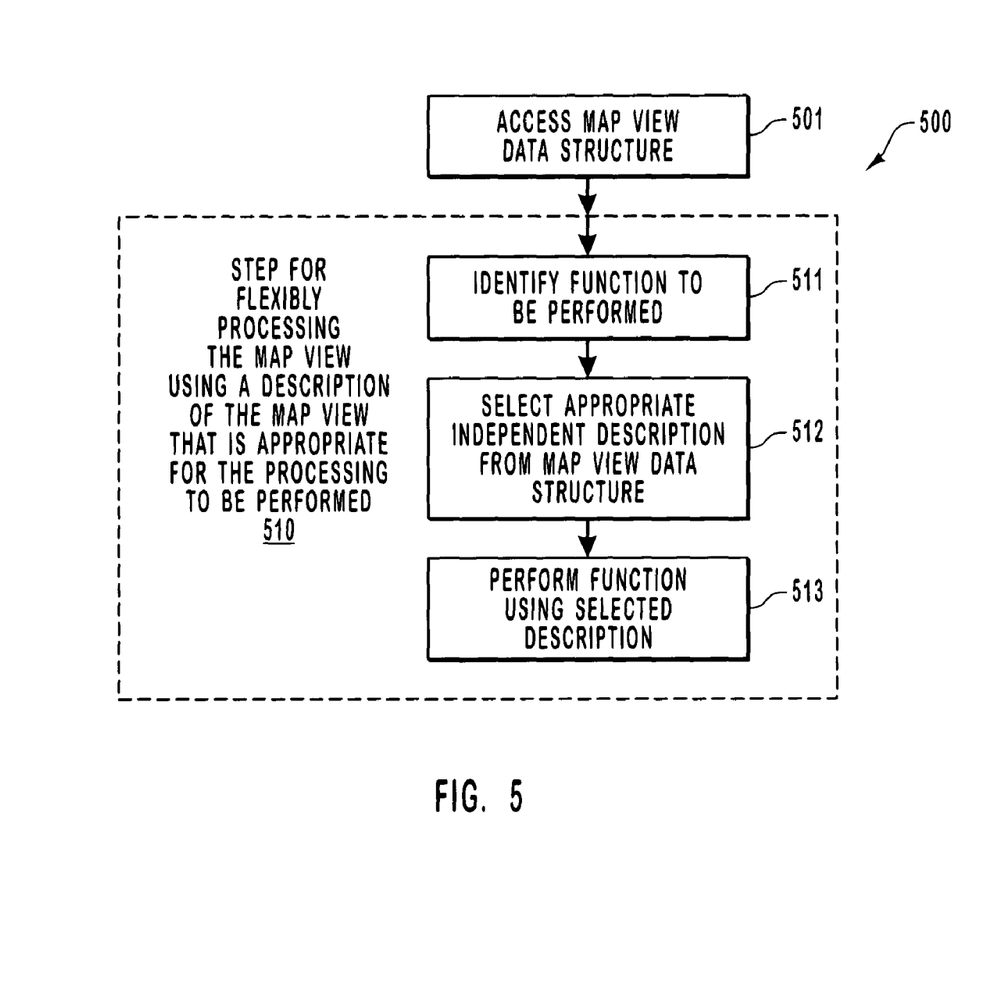
FIG. 5 illustrates a flowchart of a method for processing a map view using an independent map view description most appropriate for the processing to be performed.

FIG. 5 illustrates a flowchart of a method 500 for processing the map view data structure. In operation, the processing computing system (e.g., a computing system of the mapping service 210) accesses the comprehensive map view data structure that contains sufficient information to derive multiple independent map view descriptions (act 501). The method then includes a functional, result-oriented step for flexibly processing the map view using a description of the map view that is appropriate for the processing to be performed (step 510). While this step may include any corresponds acts that accomplish the designated result, the step 510 includes corresponding acts 511 through 513 in FIG. 5.

Specifically, the processing computing system identifies a function that is to be performed on the map view represented by the independent map view descriptions (act 511). For example, if the function is to be performed in response to a request, the function may be identified by the requesting computing system (e.g., one of the client computing systems) in the request. The processing computing system then selects an appropriate independent description for the function to be performed (act 512), and then performs the function using the selected description (act 513).

Figure 6:
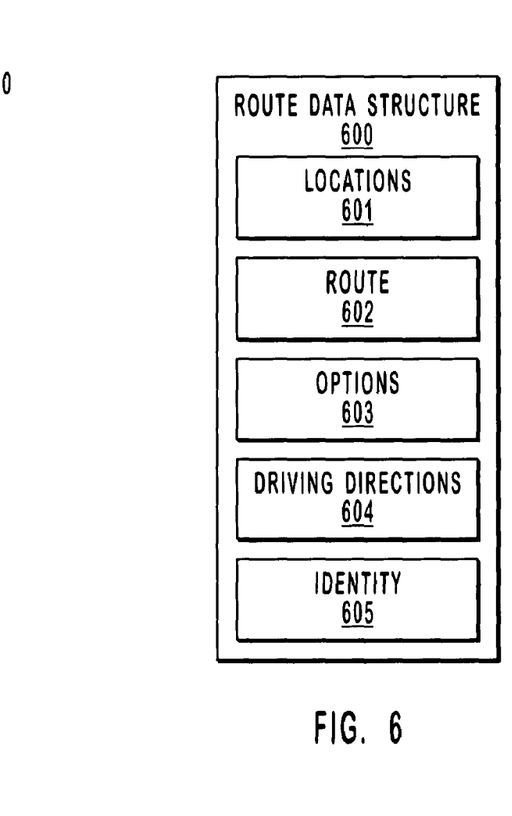
FIG. 6 illustrates a schematic of a route data structure that includes options used to calculate the route, and that may be used as a standard data structure for requests to calculate a route, response to route calculation requests, and requests to render a route.

In accordance with a third aspect of the present invention, a route data structure represents the route at various points in the progress of route calculation and rendering. Such a route data structure is illustrated in FIG. 6 as route data structure 600. The route data structure 600 includes a locations data field 601 that when populated includes the two-end points of the route, a calculated route data field 602 that when populated contains a calculated route between the two end-points, an options field 603 that when populated specifies the options used or to be used to calculate the route, a driving directions field that when populated represents driving directions for the route.

An identity data field 605 specifies whether the route data structure 600 is a request to calculate a route, a response to a route calculation request, or a rendering request. If the data structure is a route calculation request as specified by the identity field 605, then the locations data field 601 (and potentially the options field 603) is populated. If the route data structure 600 is a response to a route calculation request, then the calculated route field 602 is populated (along with potentially the locations, options, and driving directions fields). If the data structure is a request to render, then either or both of the locations and calculated route fields may be populated (along with potentially the options and driving directions fields). The rendering service then recalculates the route if appropriate, and then renders the route on a map.

This flexible data structure allows the route to be represented using a single data structure. Accordingly, the programmer may interact with a single data structure regarding of the state of route calculation and rendering. This simplifies the programming process. Furthermore, this allows greater flexibility for the programmer. For example, if the client application is running on a mobile device, with a low-bandwidth connection to the mapping service, then it may be impractical to include the entire calculated route with a render request due to the large size of the calculated route. Instead, even though a route had been pre-calculated, the programmer may simply specify the locations (and potentially the options) in the render request. The rendering service would then recalculate the route, and then render the route. Alternatively, the rendering service might check its cache to determine if the route calculation between the two end-points has been cached with the service. If the connection with the mapping service was high bandwidth, the render request may indeed include the entire previously calculated route. Accordingly, the route data structure allows for greater flexibility than conventional mechanisms in which different data, structures may represent the route depending on where the route is in the calculation and rendering process.

In one embodiment, each of the comprehensive location, map view, and route data structures may be expressed as an eXtensible Markup Language (XML) document that is constrained by a specific XML schema. This would allow the data structures to be communicated using Simple Object Access Protocol (SOAP) envelopes.

Figure 7:
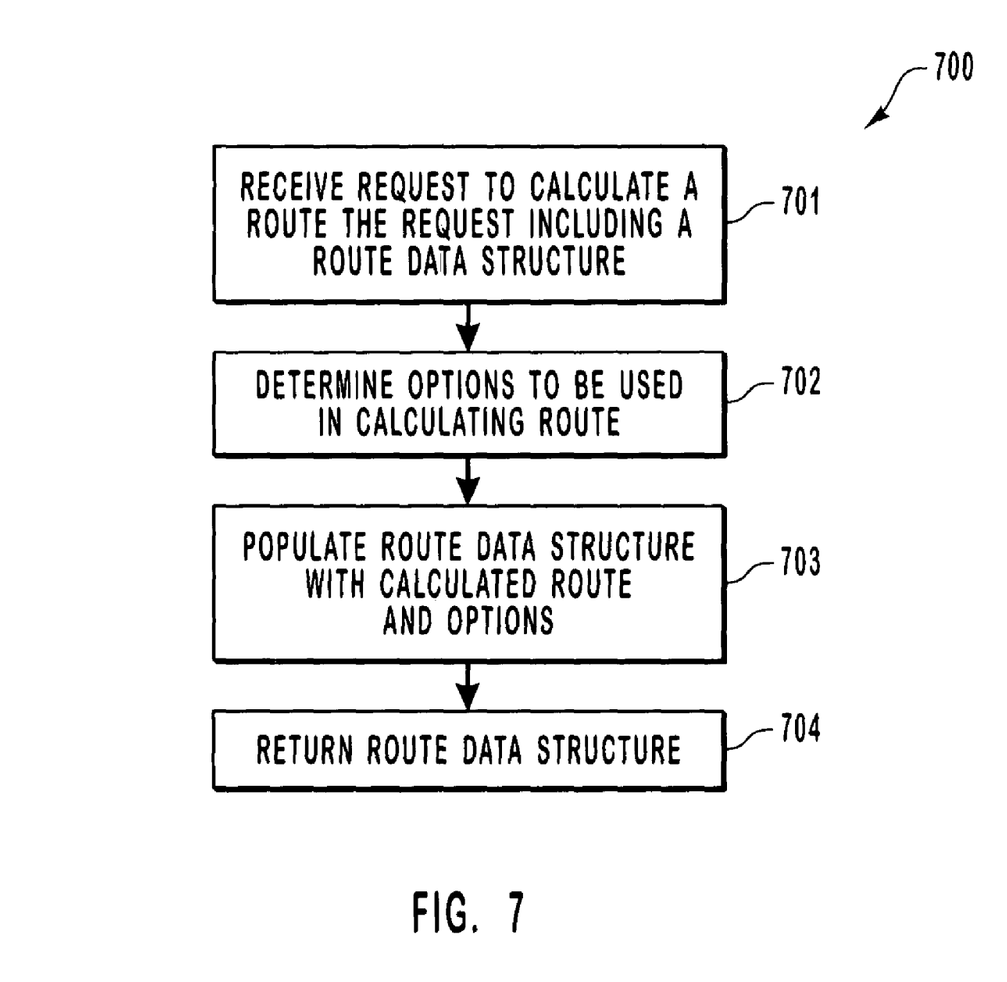
FIG. 7 illustrates a flowchart of a method for allowing a computing system that requests a route calculation to know of the options used to calculate the route.

In accordance with a fourth aspect of the present invention, FIG. 7 illustrates a method 700 for calculating a route in a manner that informs the requesting computing system of what options where used to calculate the route. The options used to calculate the route may not always be apparent. For example, perhaps the route calculation request did not specify the options, and the mapping service just used the default options. For example, the options could include a route type such as whether the route is calculated using the quickest or shortest route. The options may also include a snap type which moves the start or end point to another specific point. For a road snap, the location may be snapped to the nearest road. For a highway or city snap, the location may be snapped to the nearest highway. The route calculation then occurs after appropriately snapping the start and end locations. The requesting computing system may depend on a knowledge of what options were used to calculate the route.

In operation, the mapping service 210 receives a request to calculate a route from a requesting computing system, the request including a route data structure (act 701). The mapping service 210 then determines what options are to be used to calculate the route (act 702). If the options field 603 is populated with respect to a certain option, then the mapping service may use that option in calculating the request. On the other hand, if the options field 603 is not populated with respect to a certain option, then the mapping service may use a default setting for that option. The mapping service 210 then calculates the request, populates the routing data structure 600 with the calculated route in field 602 and the options in options 603 (act 703), and then returns the route data structure to the requesting computing system (act 704).

In this manner, the requesting computing system is informed of what options were used even if the request did not specify the option, or even if the actual options used were different than those specified in the request. The requesting computing system may then take appropriate action such as informing the user of the options were used to make the calculation. This may prompt the user to take other action such as requesting the calculation using different options. Accordingly, more intelligent route calculations are possible.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed as new and desired by Letters Patent of the United States is:

1. In a computing system capable of calculating routes between two locations in response to a request from a requesting computing system, a method for calculating the route in a manner that informs the requesting computing system of what options were used to calculate the route, the method comprising the following:

an act of receiving a request to calculate a route from a requesting computing system, the request including a routing data structure;

an act of determining what options are to be used to calculate the route, wherein the options includes at least one of a snap type and a route type;

an act of calculating the route using the options;

an act of populating the routing data structure with the calculate route;

an act of populating the routing data structure with the options; and an act of returning the routing data structure with the route and the options to the requesting computing system.

2. A method in accordance with claim 1, wherein the options include the route type and the route type is the quickest route.

3. A method in accordance with claim 1, wherein the options include the route type and the route type is the shortest route.

4. A method in accordance with claim 1, wherein the options include the snap type and the snap type is a road snap.

5. A method in accordance with claim 1, wherein the options include the snap type and the snap type is a highway or town snap type.

6. A method in accordance with claim 1, wherein the options include the route type and the route type is specified in the request.

7. A method in accordance with claim 1, wherein the options include the route type and the route type is not specified in the request.

* * * * *